United States Patent [19]
Bergbreiter et al.

[11] Patent Number: 5,783,648
[45] Date of Patent: Jul. 21, 1998

[54] CO AND TERPOLYMERS OF STYRENIC MONOMERS HAVING REACTIVE FUNCTIONAL GROUPS

[75] Inventors: David E. Bergbreiter; Yuefen Zhou, both of College Station, Tex.; Vimala M. Mariagnanam, Duluth, Ga.

[73] Assignee: The Texas A&M University System, College Station, Tex.

[21] Appl. No.: 710,608

[22] Filed: Sep. 20, 1996

[51] Int. Cl.$^6$ .................... C08F 220/22; C08F 228/00
[52] U.S. Cl. .................... 526/245; 526/286; 526/288; 526/333.4
[58] Field of Search .................... 526/245, 286, 526/265, 259, 284, 288, 333, 293, 292.5, 313, 318.1, 333.4

[56] References Cited

U.S. PATENT DOCUMENTS

| | | |
|---|---|---|
| 3,190,925 | 6/1965 | Stowe . |
| 4,008,202 | 2/1977 | Evani .................... 526/287 |
| 4,795,506 | 1/1989 | Stanley M. Sokalski .................... 148/6.14 |
| 4,978,399 | 12/1990 | Kodama et al. .................... 148/250 |
| 5,089,064 | 2/1992 | Reghi .................... 422/12 |
| 5,089,347 | 2/1992 | Hart .................... 428/461 |
| 5,112,413 | 5/1992 | Carey et al. .................... 148/251 |
| 5,242,714 | 9/1993 | Steele et al. .................... 427/379 |
| 5,246,507 | 9/1993 | Kodama et al. .................... 148/247 |
| 5,281,282 | 1/1994 | Dolan et al. .................... 148/247 |
| 5,298,289 | 3/1994 | Lindert et al. .................... 427/388 |
| 5,330,627 | 7/1994 | Grutter et al. .................... 204/181.4 |
| 5,385,616 | 1/1995 | Dougherty et al. .................... 148/274 |
| 5,449,415 | 9/1995 | Dolan .................... 106/14.05 |

OTHER PUBLICATIONS

Jose L. C. Fonseca and Jas Pal S. Badyal, Plasma polymerization of Hexamethyldisilane onto Polyethylene Film, Macromolecules, 1992, 25, 4730–4733.

Jan M. Steuffer and Thomas J. McCarthy, Polymer Monolayers Prepared by the Spontaneous Adsorption of Sulfer–Functionalized Polystyrene on Gold Surfaces, Macromolecules, 1988, 21, 1206–1208.

M. Anand, R.E. Cohen and R.F. Baddour, Surface modification of low density polyethylene in a flourine gas plasma, Polymer, 1981, 22, pp. 361–371.

Fang Sun, David G. Castner & David W. Grainger, Ultrathin Self-ASsembled Polymeric Films on Solid Surfaces. 2. Formation of 11–(n–Pentyldithio) undecaonate–Bearing Polyacrylate Monolayers on Gold Langmuir..

T.J. Lenk, V.M. Hallmark and J.F. Rabolt, Formation and Characterization of Self-Assembled Films of Sulfur–Derivatives Poly(Methyl Methacrylates) on Gold, Macromolecules, 1993, 26, 1230–1237.

F. Sun, D.W. Grainger, D.G. Castner and D.K. Leach–Scampavia, Adsorption of Ultrathin Films of Sulfur–Containing Siloxane Oligomers on Gold Surfaces and Their In Situ Modification, Macromolecules, 1994, 27, 3.

S.V. Altre and D.L. Allara, Chemical Functionalization of Strongly Adsorbed Polymer Monolayers via Liquid/Solid Interfacial Reactions, ACS Polymer Preprints, (1990), vol. 31, (p550).

I.T. Bae, H. Huang, E.B. Yeager and D.A. Scherson, In Situ Infrared Sputrlupic Studies of RedoxActive Self-Assembled Monolayers on Gold Eletrude Surfaces, Langmuir, 1991, 7, 1558–1562.

Chem Abst. 91, 57597 h (1979).
Chem Abst. 123, 24142g (1995).

*Primary Examiner*—Christopher Henderson
*Attorney, Agent, or Firm*—Balaram Gupta

[57] ABSTRACT

Present invention provides a new class of polymeric materials having utility in the formation of self assembled polymer layers on a pretreated metallic substrate. The polymeric materials are copolymers and terpolymers of styrene and styrenic derivatives containing a reactive group selected from the group consisting of hydroxy, thiol acetoxy, thioacetoxy, thiocyanate, thiolmethyl, thioacetoxymethyl, carboxy, and mixtures thereof.

7 Claims, No Drawings

5,783,648

1

CO AND TERPOLYMERS OF STYRENIC MONOMERS HAVING REACTIVE FUNCTIONAL GROUPS

BACKGROUND OF THE INVENTION

1. Field of the Invention

The present invention relates to a process for forming self assembled polymer layers on a metal surface by way of coating a polymer solution onto a treated metal substrate. Such polymer treated metal substrates can feature either hydrophobic or hydrophilic surfaces depending upon the nature of the coated polymer layer. The polymer treated metal substrates also feature improved corrosion resistance. The polymer treated metal substrates further feature improved solvent resistance, chemical resistance, wettability and adhesion properties.

2. Description of the Prior Art

The surface modification of metal surface by self assembly of organic molecules has been reported in the literature. The process of forming a well defined surfaces that moderate and mediate the chemistry of the underlying metal using an organic molecule is often called as self assembled monolayers as described in *Macromolecules* (1992), Vol. 25, (pp 4730). For example, the long chain thiols or co-functional thiols on metals like gold, silver or copper has been reported. Even though these self assembled layers are formed by chemisorption and are thermally stable, a problem of desorption of adsorbed monolayers and exchange reactions with other derivatives in solution have been observed.

A related and relevant approach to the present invention involves attachment of oligomers or polymers to metal surfaces by self assembly. For example, adsorption of copolymers of polystyrene-poly(propylene sulfide) on gold has been studied. Some other examples include use of films of sulfur-derivatized polyacrylates on gold; and sulfur containing siloxane oligomers on gold. Maleic anhydride copolymers on silver and polyacrylic acid on aluminum oxide have also been reported. Possible advantages of these kinds of systems are that the anchoring of the polymer on the solid surface by multiple attachment sites enables the formation of a more thermally and chemically stable surface.

Various types of polymeric materials are also widely used in the coating of metals in order to improve adhesion of paints to metal surfaces, and most importantly, to render metal surfaces corrosion resistant. For example, U.S. Pat. No. 4,795,506 discloses the use of solution or dispersion of poly [2,2-bis(4-hydroxyphenyl)]alkyl derivative for metal surface coating to enhance the corrosion resistance and paint adhesion characteristics. U.S. Pat. No. 5,112,413 teaches the use of protective metal coating compositions comprising of N,N-substituted glycine homopolymers and copolymers. U.S. Pat. No. 4,978,399 discloses various mixtures of compositions that includes a polymer of hydroxystyrene for the treatment of metal surfaces.

However, none of the prior art references described above discloses polymeric compositions, which can be used to coat the metallic surfaces having a metal oxide layer. Most importantly, none of the references described above discloses formation of a self assembled polymer layer on a metallic substrate using polymeric materials having reactive groups. Therefore, it is an object of this invention to provide a process for the coating of metallic surface using novel polymeric compositions having reactive groups. Furthermore, an additional objective of this invention is to provide polymer coated metallic substrates which are more thermally and chemically stable. Yet another objective of

2 this invention is to provide a method for the formation of multiple layers of polymeric materials on a metallic surface by a chemical reaction of the first coated polymer layer with another similar or dissimilar polymeric material having suitable functional groups.

Prior Art

The following references are disclosed as background prior art.

U.S. Pat. No. 4,795,506 discloses processes for after treatment of metals using 2,2-bis(4-hydroxyphenyl)alkyl poly derivatives.

U.S. Pat. No. 5,089,064 discloses processes for corrosion resisting treatments for aluminum surfaces.

U.S. Pat. No. 5,089,347 discloses metallized composite polymer films and a method for preparing the same.

U.S. Pat. No. 5,112,413 discloses a method for treating metal surfaces with a polymer solution.

U.S. Pat. No. 5,242,714 discloses processes for forming protective base coatings on metals.

U.S. Pat. No. 5,246,507 discloses processes for metal surface treatment using aqueous polymeric solutions.

U.S. Pat. No. 5,281,282 discloses compositions and a process for treating metal.

U.S. Pat. No. 5,298,289 discloses polyphenol compounds and treatment and after treatment of metal, plastic and painted surfaces therewith.

U.S. Pat. No. 5,330,627 discloses thermosetting coating compositions and their use.

U.S. Pat. No. 5,385,616 discloses a method for inhibiting corrosion of a metal surface by formation of iron carboxylate.

U.S. Pat. No. 5,449,415 discloses compositions and a process for treating metals.

*Macromolecules* (1992), Vol. 25, (pp 4730) discloses the use of long chain thiols or ω-functional thiols for treating metals like gold, silver or copper.

*Polymer* (1981), Vol. 22, (pp 361) also discloses the use of thiols for surface treatment of metals like gold, silver or copper.

*Macromolecules*, (1988), Vol. 21, (pp 1204–1208) discloses an adsorption of copolymers of polystyrene-poly (propylene sulfide) on gold.

*Langmuir*, (1993), Vol. 9, (pp 3200–3207) discloses the use of films of sulfur-derivatized polyacrylates on gold.

*Macromolecules*, (1993), Vol. 26, (pp 1230–1237) discloses the use of films of sulfur-derivatized polyacrylates on gold.

*Langmuir*, (1991), Vol. 7, (pp 1558) discloses the use of films of sulfur-derivatized polyacrylates on gold.

*Macromolecules*, (1994), Vol. 27, (pp 3053–3062) discloses the application of sulfur containing siloxane oligomers on gold.

*Proc. 1st Pacific Polym. Conf.* (1989), (pp 460) discloses the use of Maleic anhydride copolymers on silver.

*ACS Polym. Prepr.*, (1990), Vol. 31, (pp 550) discloses the use of polyacrylic acid on aluminum oxide.

All of the references described herein are incorporated herein by reference in their entirety.

SUMMARY OF THE INVENTION

It has now been found that a self assembled polymer layer can be readily formed on a pretreated metallic surface having a metal oxide layer on the surface. In fact, the polymer layer so formed permanently adheres to the base metallic surface thus offering improved corrosion resistance, wettability, solvent resistance, thermal resistance, and adhesion characteristics.

The process of the present invention comprises the steps of: a) preparing a metallic substrate by treating (cleaning) such that a reactive zerovalent metal or metal oxide layer is exposed; b) preparing a solution or a dispersion of a novel polymeric material by dissolving or dispersing the polymeric material in a solvent, the polymer being characterized by having recurring combinations consisting essentially of acyclic, cyclic and aromatic mutivalent moieties at least one of which contains a reactive substituent independently selected from the group consisting of —OH, —OCOR, —SH, —SCOR, —CH$_2$SH, —CH$_2$SCN, —CH$_2$SCOCH$_3$, —COOH, —COOR, and mixtures thereof, where R is an aliphatic, alicyclic, or an aromatic moiety containing 1 to about 20 carbon atoms; and c) contacting said metallic substrate with said solution or dispersion for a sufficient period of time and at suitable temperature and pressure conditions to form at least one layer of polymeric material on said metallic substrate.

In another aspect of this invention the polymeric materials of this invention are novel polymeric compositions.

DETAILED DESCRIPTION OF THE INVENTION

It has now been found that a self assembled polymer layer can be readily formed on a pretreated metallic surface having a metal oxide layer on the surface. In fact, the polymer layer so formed permanently adheres to the base metallic surface thus offering improved corrosion resistance, wettability, solvent resistance, thermal resistance, and adhesion characteristics.

The process of the present invention comprises the steps of: a) preparing a metallic substrate by treating (cleaning) such that a reactive zerovalent metal or metal oxide layer is exposed; b) preparing a solution or a dispersion of a novel polymeric material by dissolving or dispersing the polymeric material in a solvent, said polymer being characterized by having recurring combinations consisting essentially of acyclic, cyclic and aromatic multivalent moieties at least one of which contains a reactive substituent independently selected from the group consisting of—OH, —OCOR, —SH, —SCOR, —CH$_2$SH, —CH$_2$SCN, —CH$_2$SCOCH$_3$, —COOH, —COOR, and mixtures thereof, where R is an aliphatic, alicyclic, or an aromatic moiety containing 1 to about 20 carbon atoms; and c) contacting said metallic substrate with said solution or dispersion for a sufficient period of time and at suitable temperature and pressure conditions to form at least one layer of polymeric material on said metallic substrate.

Accordingly, the metallic substrates for the purpose of this invention are in the form of a film, sheet, foil, wire, wafer, tube, fiber, or a rod. Most forms of metallic substrates are in the form of a film, sheet, wafer, foil, or a rod.

The metallic substrate is selected from the group consisting of copper, silver, gold, aluminum, zinc, iron, steel, stainless steel, and mixtures thereof. Preferred metallic substrates are copper, iron, steel, stainless steel and aluminum.

The metallic substrates can also be metallized non-metallic substrates. Representative examples of non-metallic substrates include silicon wafer and a variety of plastic materials known in the art. Specific examples of plastic materials may be selected from the group consisting of polyethylene, polypropylene, polystyrene, polyolefins, cellophane, polyethylene terephthalate, nylon, polyvinyl chloride, and mixtures thereof. Preferred non-metallic substrates are silicon wafer and films of polyethylene terephthalate, polyethylene, and polypropylene. The preferred non-metallic substrate is a silicon wafer.

The metallization of non-metallic substrate may be carried out by any of the techniques well known in the art. In one preferred embodiment, the gold is deposited on a silicon wafer using an electron beam deposition. Using this technique, first a layer of about 200 Å thickness titanium is deposited on a polished silicon wafer, and then a layer of gold of about 2000 Å thickness is deposited.

The metallization of plastic materials can also be effected by conventional metallizing techniques—for example, by deposition from a suspension of finely divided metallic particles in a suitable liquid vehicle, or by a electron beam evaporation, electroless plating, or by a vacuum deposition process, in which a metal is evaporated onto the adherent polymeric resin surface in a chamber maintained under conditions of high vacuum.

In a typical metallic surface treatment operation employing this invention, the metallic substrate to be treated is initially treated by a chemical or physical process and then water rinsed to remove grease and dirt from the surface. The purpose of treating the metal surface is to have a zerovalent metal or metal oxide exposed on the surface. Various different physical and chemical methods well known in the art may be used to treat the metallic substrate of this invention. Such examples include acid wash, base wash, treatment with metal phosphate solutions, extracting with organic solvents, heating to high temperatures, and subjecting metal surface to an open flame. For example, a metallized silicon wafer metallized with gold is cleaned by treating the wafer with "piranha" solution (a 3:1 mixture of sulfuric acid and 30% hydrogen peroxide). Whereas a preferred method to clean an aluminum foil is to extract the foil in toluene for several hours, preferably for about 8 hours to 30 hours, and then to heat the foil to around 220° C. to 250° C. for several days, preferably for about 3 to 5 days. Thus, as mentioned hereinabove, various physical and chemical methods known in the art may be used to treat/clean the metallic surface of this invention.

The polymeric material suitable for the formation of self assembled layer on a metallic substrate may be derived from a variety of structures including acyclic, cyclic, or aromatic multivalent moieties. Each of the acyclic, cyclic, or aromatic multivalent moieties additionally contains at least one reactive substituent independently selected from the group consisting of —OH, —OCOR, —SH, —SCOR, —CH$_2$SH, —CH$_2$SCOCH$_3$, —COOH, —COOR, and mixtures thereof. Where R is an aliphatic, alicyclic, or an aromatic moiety containing 1 to about 20 carbon atoms.

Illustrative of acyclic structures that are suitable as polymeric materials of this invention include unsaturated C$_1$ through C$_{10}$ straight chain or branched aliphatic units capable of forming polymers such as ethylene, propylene, butylene, pentalyene, and the like. Illustrative of cyclic structures suitable for forming the polymeric materials of this invention include cyclohexylene, vinyl cyclohexane, norbornylene, bornylene, cyclopentalene, cycloheptalene, and the like. Illustrative of aromatic structures are phenylene, biphenylene, naphthalene, pyridine, pyrazine, furan, thiophene, pyran, and the like.

The preferred polymeric material of the present invention has the formula:

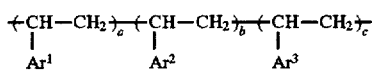

wherein Ar¹, Ar² and Ar³ are each independently selected from the group consisting of phenylene, biphenylene, pyridine, naphthylene, quinolyene, pyrazine, furan, thiophene, pyran and mixtures thereof. At least one of the hydrogen atoms on said moieties Ar¹, Ar², and Ar³ may be replaced with reactive substituents independently selected from the group consisting of —OH, —OCOR, —SH, —SCOR, —CH$_2$SH, —CH$_2$SCN, —CH$_2$SCOCH$_3$, —COOH, —COOR, —CH$_2$O(PEG)$_d$OCH$_3$, —CH=CH$_2$, and mixtures thereof, where PEG is a polyethylene glycol moiety, d is the molecular weight of the polyethylene glycol moiety and may range from about 200 to about 10,000, and R is an aliphatic, alicyclic, or an aromatic moiety containing 1 to about 20 carbon atoms.

Optionally, one or more of the hydrogen atoms on said aromatic moieties Ar¹, Ar², and Ar³ moieties may additionally be replaced with substituents, each independently selected from the group consisting of Br, F, Cl, I, phenyl, tolyl, alkyl, and fluoroalkyl groups having the formula C$_n$H$_x$F$_y$, where n is an integer from 1 to 4, x and y are integers from 0 to 2n+1, and the sum of x and y is 2n+1.

In a preferred polymeric material, the Ar¹, Ar², and Ar³ moieties are unsubstituted except that at least one of the hydrogen atoms is replaced in these moieties with a reactive group as mentioned above. a, b, and c in the above structure represent mole precents of said moieties Ar¹, Ar² and Ar³, where a+b+c=100.

Examples of more preferred polymeric materials of this invention which are novel compositions are phenylene moieties of the formula:

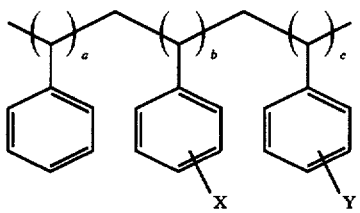

wherein X is a reactive substituent as described above and is selected from the group consisting of —OH, —OCOR, —SH, —SCOR, —CH$_2$SH, —CH$_2$SCN, —CH$_2$SCOCH$_3$, —COOH, —COOR, and mixtures thereof, where R is an aliphatic, alicyclic, or an aromatic moiety containing 1 to about 20 carbon atoms. Wherein Y may be X or —CH$_2$O (PEG)$_d$OCH$_3$ or —CH=CH$_2$, where PEG is a polyethylene glycol moiety and d represents molecular weight of said polyethylene glycol moiety, which ranges from about 200 to about 10,000. Optionally, one or more of the hydrogen atoms on the phenylene units may additionally be replaced with substituents independently selected from the group consisting of Br, F, Cl, I, phenyl, tolyl, alkyl, and fluoroalkyl groups having the formula C$_n$H$_x$F$_y$, where n is an integer from 1 to 4, x and y are integers from 0 to 2n+1, and the sum of x and y is 2n+1. Preferably the phenylene units are unsubstituted except for the reactive group, X present on one of the phenylene units and moiety Y present on one of the other two phenylene units as mentioned hereinabove.

a, b, and c represent mole percents of said repeating units, where a is from about 0% to about 95%, b is from about 5% to about 100%, and c is from about 0% to about 45%.

Preferred phenylene units are selected from the group consisting of styrene, 2-hydroxystyrene, 4-hydroxystyrene, 2-methyl-4-hydroxystyrene, 3-methyl-4-hydroxystyrene, 2-acetoxystyrene, 4-acetoxystyrene, 2-methyl-4-acetoxystyrene, 3-methyl-4-acetoxystyrene, 2-mercaptostyrene, 4-mercaptostyrene, 2-methyl-4-mercaptostyrene, 3-methyl-4-mercaptostyrene, 2-thioacetoxystyrene, 4-thioacetoxystyrene, 2-thioacetoxymethylstyrene, 4-thioacetoxymethylstyrene, 2-methyl-4-thioacetoxystyrene, 3-methyl-4-thioacetoxystyrene, 2-thiocyanatomethylstyrene, 4-thiocyanatomethylstyrene, 2-methyl-4-thiocyanatomethylstyrene, 3-methyl-4-thiocyanatomethylstyrene, 4-thiolmethylstyrene, 2-thiolmethylstyrene, 2-methyl-4-thiolmethylstyrene, 3-methyl-4-thiolmethylstyrene, 4-trifluoroacetoxystyrene, vinyl benzyl chloride, vinyl benzyl trichloroacetate, a styrenic derivative having the structure:

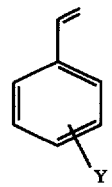

and mixtures thereof, wherein Y may be X or —CH$_2$O(PEG)$_d$OCH$_3$ or —CH=CH$_2$, where PEG is a polyethylene glycol moiety and d represents molecular weight of said polyethylene glycol moiety, which ranges from about 200 to about 10,000.

Most preferably the phenylene units are selected from the group consisting of styrene, 2-hydroxystyrene, 4-hydroxystyrene, 2-acetoxystyrene, 4-acetoxystyrene, 4-mercaptostyrene, 4-thioacetoxystyrene, 4-thioacetoxymethylstyrene, 2-thiocyanatomethylstyrene, 4-thiocyanatomethylstyrene, 4-thiolmethylstyrene, vinyl benzyl chloride, a styrenic derivative having the structure:

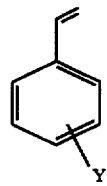

and mixtures thereof, wherein Y may be X as described hereinabove or —CH$_2$O(PEG)$_d$OCH$_3$ or —CH=CH$_2$, where PEG is a polyethylene glycol moiety and d represents molecular weight of said polyethylene glycol moiety, which ranges from about 200 to about 10,000.

The preferred polymers described herein are made by an addition polymerization of the preferred phenylene units described hereinabove. The preparation of addition polymers are well known in the art, and may be made readily by free radical, or cationic, or anionic polymerizations. Preferred method for making these polymers is by free radical polymerization which is well known in polymer chemistry. Using free radical polymerization techniques, the novel polymers of the present invention may be made by bulk, solution, suspension, or emulsion polymerization processes following the procedures well known in the art. Examples of such polymerization processes are described in U.S. Pat. No. 4,678,843; U.S. Pat. No. 4,689,371; U.S. Pat. No. 4,775,730; and U.S. Pat. No. 4,822,862, which are hereby incorporated herein by reference in their entirety.

The homopolymers, copolymers, and terpolymers of this invention may be prepared by a free radical solution polymerization. A free radical type of polymerization initiator or "catalyst" is generally employed which can be an azo compound such as 2,2'-azobis(2,4-dimethylvaleronitrile) (sold by du Pont as "VAZO-52"), 2,2'-azobisisobutyronitrile (AIBN; sold by du Pont as "VAZO-64"), 2,2'-azobis (methylbutyronitrile) (sold by du Pont as "VAZO-67"), and 1,1'-azobis(cyanocyclohexane) (sold by du Pont as "VAZO-88"). Other free-radical polymerization initiators which may be used are peroxy compounds, e.g., benzoyl peroxide and potassium persulfate, and peresters and peroxyketals. Generally used polymerization initiator is an azoinitiator, AIBN.

The preferred polymers of the present invention may be homopolymers, copolymers, or terpolymers. Examples of preferred homopolymers are poly(4-acetoxystyrene), poly (4-hydroxystyrene), poly(4-thioacetoxystyrene), poly(4-mercaptostyrene), poly(4-thioacetoxymethylstyrene), poly (4-thiolmethylstyrene), and poly(4-thiocyanatomethylstyrene). Most preferred homopolymers are poly(4-acetoxystyrene), and poly(4-hydroxystyrene). Preferred copolymers contain styrene as one of the comonomers, and the other monomer is a styrenic derivative containing the reactive group mentioned hereinabove. Most preferred copolymers are derived from styrene and one of the monomers selected from the group consisting of 4-thioacetoxymethylstyrene, 4-thiocyanatomethylstyrene, 4-thiolmethylstyrene, 4-acetoxystyrene, 4-hydroxystyrene, and 4-trifluoroacetoxystyrene.

Similarly, preferred terpolymers of the present invention consists of styrene as the first monomer, styrenic derivative consisting of a reactive group as the second monomer, and a third monomer derived from vinyl benzyl chloride, vinyl benzyl trichloroacetate, which can further be functionalized by a polyethylene glycol moiety.

Within the copolymer, the molar ratio of styrene to the reactive styrenic monomer can be 1:99 to 99:1, preferably 60:40 to 40:60, and more preferably 90:10 to 10:90. Within the terpolymer, the molar percents of each of the monomers—styrene, reactive styrenic monomer, and vinyl benzyl chloride derivative—can range from 1 to 98, and preferably 25 to 50. Most preferred molar ratio ranges from about 60:20:20 to about 90:5:5.

The molecular weights of the polymers used in the present invention may be in the range of from about 2,000 to about 100,000 or greater, preferably the molecular weight range is in from about 3,000 to about 80,000, and more preferably from about 4,000 to about 60,000.

The polymeric material is dissolved or dispersed in a suitable organic solvent or in water. The organic solvents that can be used for dissolving or dispersing the polymeric material may be selected from the group consisting of acetonitrile, methyl alcohol, ethyl alcohol, acetone, methyl ethyl ketone, t-butyl methyl ketone, ethyl acetate, t-butyl acetate, toluene, chloroform, methylene chloride, tetrachloroethylene, and mixtures thereof. The preferred organic solvents are acetonitrile, toluene, acetone, chloroform, methyl alcohol, and mixtures thereof.

The polymeric materials of the present invention may generally be used in surface treatment solutions over a wide range of concentrations. It will be appreciated that the levels of use or useful ranges will vary with many factors well known to the skilled artisan. Useful levels of the polymeric compositions of the present invention dissolved or dispersed in a solvent may be in the range of from about 0.0001 weight % to about 30 weight %, based on the total weight of the composition. Preferably, the concentration of the solution is in the range of from about 0.001 weight % to about 15 weight %, and more preferably 0.01 weight % to 10 weight %.

Application of the polymeric compositions of the present invention in the contacting step to a metallic substrate can be carried out by any conventional method. For example, the polymeric composition can be applied by spray coating, roller coating, or dipping. The preferred method of application of the polymeric composition is by dipping. The temperature of the solution applied can vary over a wide range, but is preferably from about 25° C. to about 80° C. The pressure in this application step is not critical and can be subatmospheric, atmospheric, or super atmospheric. After application of the polymer solution to the metallic surface, the surface can optionally be rinsed with the same solvent used for dissolving the polymeric material. 4-hydroxystyrene, 4-acetoxystyrene, and 4-trifluoroacetoxystyrene. The contacting temperature of the aluminum foil in the polymer solution is from about 25° C. to about 80° C., preferably from about 25° C. to about 60° C.

An important advantage derived from the practice of the present invention is the use of relatively dilute solutions of the polymeric materials having reactive groups to coat a metallic surface to form a stable polymeric layer on the metallic surface. Another important advantage derived from the practice of the present invention is that the polymeric layer so formed on a metallic surface can further be reacted with another functional molecule such that the surface characteristics of the metallic substrate can be regulated to form either a hydrophobic or a hydrophilic surface.

The polymeric treatment process according to this invention is useful in treating a metallic substrate to form surfaces that feature either hydrophobic or hydrophilic surfaces. Such surfaces also feature improved corrosion resistance, solvent resistance, and chemical resistance. In addition, such treated substrates also feature improved wettability and adhesion properties.

This invention is further illustrated by the following examples which are provided for illustration purposes and in no way limit the scope of the present invention.

EXAMPLES (GENERAL)

In the Examples that follow, the following abbreviations are used:
PS—Polystyrene
PAS—Poly(4-acetoxystyrene), a homopolymer.
PHS—Poly(4-hydroxystyrene), a homopolymer.
POSAC—A copolymer of styrene and 4-thioacetoxymethylstyrene.
POSCN—A copolymer of styrene and 4-thiocyanatomethylstyrene.
POSH—A copolymer of styrene and 4-thiolmethylstyrene.
P(SAS)—A copolymer of styrene and 4-acetoxystyrene.
P(SHS)—A copolymer of styrene and 4-hydroxystyrene.
P(STFAS)—A copolymer of styrene and 4-trifluoroacetoxystyrene.
PEG—Polyethylene glycol.
PSPEVB1SCN—A terpolymer of styrene, 4-thiocyanatomethylstyrene, and vinyl benzyl polyethylene glycol, where molecular weight of the polyethylene glycol moiety is 2000, and termed $PEG_{2000}$.

After polymer application, the treated metallic surface is optionally dried. Drying can be carried out, for example, in an oven under a nitrogen atmosphere. While room temperature drying can be employed, the use of elevated temperatures is preferred to decrease the amount of drying time required.

In one specific embodiment of the present invention, the polymer treated metallic substrate produces a hydrophobic surface. The hydrophobicity (or hydrophilicity) of the surface may be measured by a variety of techniques well known in the art. In this embodiment, the hydrophobicity of the metallic surface was measured by contact angle goniometric measurements.

The surface characteristics of the metallic surface can further be altered by contacting the metallic surface with various other functional molecules which are similar or dissimilar to the polymeric materials of the present invention. Examples of functional molecules that can be used to regulate the surface characteristics of the metallic substrates include acrylic acid, methacrylic acid, acrylonitrile, methacrylonitrile, acrylamide, vinyl acetate, t-butyl acrylate, methyl acrylate, ethyl acrylate, dimethyldichlorosilane, 1,6-diisocyanatohexane, sodium salt of monomethoxy poly (ethylene glycol), and mixtures thereof.

In this specific embodiment, the subsequent treatment with a functional molecule also may be carried out in the presence of an initiator which is capable of grafting the functional molecule onto the polymeric material coated onto the metallic substrate in the contacting step. Various initiators well known in the art that can affect such grafting can be used. Specific classes of initiators used in the art include photo, thermal, or acid initiators. Photoinitiators are especially preferred for such grafting.

In another specific embodiment, the polymer treated metallic substrate in accordance with the present invention can further be cured by irradiation using any high energy radiation source well known in the art. Preferred radiation sources are X-rays and UV, and more preferably the polymer treated samples are irradiated using an X-ray source.

In another preferred embodiment, aluminum foil is treated by extracting with toluene for 24 hours and then heated to about 235° C. and maintained at that temperature for 4 days. The aluminum foil so treated/cleaned is then contacted with a polymeric solution formed by dissolving a copolymer either in toluene or acetonitrile. The copolymers used in this preferred embodiment are formed from styrene and a monomer selected from the group consisting of PSPEVB 1SAC—A terpolymer of styrene, 4-thioacetoxymethylstyrene, and vinyl benzyl polyethylene glycol, where molecular weight of polyethylene glycol moiety is 2000, and termed $PEG_{2000}$.

P(SASVBC)—A terpolymer of styrene, 4-acetoxystyrene, and vinyl benzyl chloride.

P(SASVBOCOCCl$_3$)—A terpolymer of styrene, 4-acetoxystyrene, vinyl benzyl trichloroacetate.

DMF—N,N'-dimethylformamide
THF—Tetrahydrofuran
AIBN—2,2'-Azobisisobutyronitrile.
NMR—Nuclear magnetic resonance spectroscopy, usually of either proton, $^1$H, and/or carbon 13, $^{13}$C.
IR—Infrared spectroscopy.
XPS—X-ray photoelectron spectroscopy The homopolymers, copolymers, and terpolymers of the present invention may be prepared by the methods well known in the art. However, illustrative procedures for the synthesis of a few of the copolymers and terpolymers are provided below.

EXAMPLE A

Preparation of copolymer of styrene and 4-thiocyanatomethylstyrene—Molar ratio 90:10

3.06 g (0.018 mol) of 4-thiocyanatomethylstyrene and 64.0 mg (0.4 mmol) of AIBN were taken in a three necked flask fitted with a reflux condenser, and purged continuously with argon. The flask was evacuated under aspirator pressure and backfilled with nitrogen three times. To this mixture was added 200 mL of distilled toluene followed by 20 mL (0.1 8 mol) of distilled styrene. The contents of the flask was then heated to 100° C. in an oil bath and maintained at that temperature for a period of about 24 hours. At the end of this period, the contents of the flask were allowed to cool to room temperature and the contents were precipitated from 1400 mL of methanol. The precipitate was separated by filtration and dried to yield the copolymer (9.5 g). The structure of the produced copolymer was verified by $^1$H and $^{13}$C NMR, and IR spectroscopy. The molecular weight, $M_v$, of the copolymer as determined by the viscosimetric measurements was 41,700.

Various other copolymers disclosed herein may be synthesized similarly using the procedure described above.

EXAMPLE B

Preparation of terpolymer of styrene, 4-thiocyanatomethylstyrene, and vinyl benzyl polyethylene glycol The terpolymers of the present invention were synthesized using a three step approach as detailed below:

Step I: Following the procedure as outlined in Example A, a copolymer of styrene and vinyl benzyl chloride of 85:15 molar ratio was prepared.

Step II: A terpolymer of styrene, vinyl benzyl chloride, and vinyl benzyl polyethylene glycol was prepared as follows: 1 g (0.04 mol) of dry sodium was stirred with 0.3 g (2.34 mmol) of naphthalene dissolved in 15 mL of THF for 10 hours at room temperature. The green solution of naphthalene-sodium was separated from the excess sodium by cannulation. This solution was then mixed with 2.3 g of $PEG_{2000}$ dissolved in 10 mL of THF, and the combined mixture was stirred for 10 minutes during which time the solution had turned light green in color. To this mixture was added 8 g of the copolymer, from Step I, dissolved in 40 mL of THF by cannula and the contents were stirred for an additional period of about 75 minutes. At the end of this period, the contents were concentrated in vacuo to yield a hard white solid that was Soxhlet extracted with methyl alcohol overnight to remove the excess PEG. As the extracted solid could not be precipitated in any suitable solvent it was dissolved in dichloromethane. Concentration of this solution in vacuo yielded the terpolymer as a crystalline material. The structure of the so formed terpolymer was verified by $^1$H and $^{13}$C NMR, and IR spectroscopy. The molecular weight, $M_v$, of the terpolymer as determined by the viscosimetric measurements was 56,600.

Step III: The desired terpolymer of styrene, 4-thiocyanatomethylstyrene, and vinyl benzyl polyethylene glycol was synthesized from the terpolymer of Step II as follows: 1.5 g of the terpolymer formed in Step II was mixed with 350 mL of toluene taken in a 500 mL flask and the contents stirred. To this mixture was added 1.2 g of potassium thiocyanate dissolved in 115 mL of a solvent mixture of DMF and acetone (100/15, v/v). The entire contents of the flask was then heated and allowed to reflux for about 30 hours. The contents were then allowed to cool to room temperature at which time slightly turbid mixture became homogeneous. The solvents were evaporated under vacuo and the residual solids were precipitated from water. The precipitate was washed with methanol and dried to yield a white powder of the terpolymer (0.9 g). The structure of the produced terpolymer was verified by $^1$H and $^{13}$C NMR, and IR spectroscopy.

Various other terpolymers of the present invention may be synthesized using the procedures described in Step I through III of Example B with appropriate modifications so as to form the terpolymers consisting of different reactive groups.

General Analytical Techniques Used for the Polymer Modified Surface Analysis

A variety of analytical techniques were used to study the polymer modified metallic substrates which included the following:

XPS Spectroscopy: The chemical composition in the top 50–100 Å of the surface was assayed by XPS spectroscopic analysis.

Reflectance IR Spectroscopy: The presence of the polymeric overlayers was confirmed by reflectance IR studies. Analysis of very thin coatings in the nanometer range is normally done at an incident angle of 80°.

Contact Angle Goniometry: The contact angle measurements analyzed the top 5 Å of the surface and provided information about the hydrophobicity or hydrophilicity of the surface.

Example 1

The polymeric layers on gold wafers were formed using the following procedure:

Preparation of Gold Wafers: The gold wafers were prepared by electron beam deposition of 100 Å of titanium and 2000 Å of gold onto polished silicon single crystalline wafers.

Cleaning of Gold Wafers: Prior to the formation of polymeric layers on gold wafers, the gold wafers were cleaned as follows: The gold wafer was diced into 1×1 cm$^2$ size wafers. These were taken in 20 mL reaction vials and treated with "piranha" solution (a 3:1 mixture of sulfuric acid and 30% hydrogen peroxide) for about 5 to 10 seconds. CAUTION: this mixture is extremely corrosive and should be used with caution as it reacts violently with most organic materials. The wafers were then washed copiously with deionized water and then blown dry with nitrogen.

Preparation of Polymer Solution: The copolymers as listed in Table I were dissolved in chloroform so that solutions containing 0.01 to 10 weight percent polymer were prepared.

Treatment with Polymeric Solution: The cleaned and dried gold wafers were immediately treated with the polymer solution taken in 20 mL reaction vials. All of the polymers used in this Example were copolymers as listed in Table 1, and were dissolved in chloroform. All adsorptions of polymeric materials were done for 22 hours at room temperature. After the allowed time for adsorption of the polymeric material onto a surface of the gold wafer, the wafers were rinsed copiously with chloroform, the solvent used to dissolve the polymeric material, and then blown dry with nitrogen. A control experiment was also carried out with a gold wafer that was immersed in chloroform for 22 hours (Run No. 1, Table 1). The wafers were then analyzed by XPS. The results are summarized in Table 1.

TABLE 1

| Run No. | Copolymer | Composition (mol %) (styrene:other monomer) | Au | S | C | O |
|---|---|---|---|---|---|---|
| 1 | Starting Au wafer | — | 25.2 | 0.0 | 62.3 | 12.3 |
| 2 | POSH | 95:5 | 9.4 | 1.5 | 82.6 | 6.2 |

TABLE 1-continued

| Run No. | Copolymer | Composition (mol %) (styrene:other monomer) | Au | S | C | O |
|---|---|---|---|---|---|---|
| 3 | POSH | 90:10 | 3.8 | 1.2 | 91.4 | 2.9 |
| 4 | POSCN | 95:5 | 16.5 | 2.5 | 73.2 | 7.5 |
| 5 | POSCN | 90:10 | 16.7 | 3.5 | 75.2 | 5.6 |
| 6 | POSAC | 90:10 | 17.9 | 5.2 | 68.4 | 8.4 |

It is quite apparent from these results that the polymeric layers are formed on gold wafers. In fact, the amount of sulfur on the surface is increased when the amount of sulfur functionality in the copolymer is increased as evidenced by Run Nos. 3, 5, and 6.

Example 2

This example illustrates the application of polymeric materials onto a cleaned surface of a metallic foil thereby forming polymeric layers on the foil surface.

Preparation of Metallic Foil for Polymer Treatment: The metallic foil used in this Example 2 was a copper foil. The copper foil (1 mm thick) was heated to red hot in a flame, quickly transferred to a flask, and allowed to cool under a nitrogen flow. This copper foil was then immersed in 12% nitric acid (12 g of nitric acid diluted in 100 mL of distilled water), and the foil is etched in a sonicator for 5 minutes. The foil was removed and then copiously washed with deionized water and blown dry with nitrogen.

The polymer solutions for treatment of the copper foil were prepared following the procedure given in Example 1. The polymer adsorption experiments were also carried out in accordance with the procedures set forth in Example 1 with the exception that the adsorption experiments were carried out for a period of 16 hours at room temperature. The polymer treated samples were analyzed by XPS spectroscopy. The results are summarized in Table 2. A control experiment (Run No. 1) was also carried out wherein the copper foil was not treated with a polymer solution, but was immersed in chloroform for 16 hours (Run No. 1, Table 2).

TABLE 2

| Run No. | Copolymer | Composition (mol %) (styrene:other monomer) | Cu | S | C | O | N |
|---|---|---|---|---|---|---|---|
| 1 | Starting Cu foil | — | 6.7 | 0.0 | 36.6 | 46.8 | 9.8 |
| 2 | POSH | 95:5 | 4.0 | 1.0 | 58.1 | 31.6 | 5.4 |
| 3 | POSH | 90:10 | 0.5 | 0.9 | 89.4 | 7.3 | 1.6 |
| 4 | POSCN | 95:5 | 5.6 | 0.2 | 47.1 | 38.2 | 8.9 |
| 5 | POSCN | 90:10 | 5.2 | 0.2 | 50.0 | 38.6 | 5.9 |
| 6 | POSAC | 90:10 | 6.0 | 0.0 | 38.6 | 48.7 | 6.8 |

It is apparent from these results that carbon contents on the copper foil increased in all cases after polymer treatment, thus evidencing the formation of polymeric layers on the surface of copper foil. In addition, an increase in the level of sulfur derivatized monomer in the copolymer generally increased the level of carbon (Run Nos. 3 and 5).

Example 3

This Example illustrates the effect of temperature on the level of adsorption of polymeric material during the polymer contacting step.

13

The procedure of Example 2 was essentially followed except that the contacting step was carried out at 57° C. for a period of 16 hours. The copolymer used was a 90:10 composition of POSCN. The atomic percentages on the surface of the copper foil so treated as determined by XPS analysis were as follows: Cu—5.2%, S—0.7%, C—61.3%, O—24.7%, and N—8.1%. This clearly shows that higher levels of polymeric materials on the surface of copper foil can be attained by carrying out the adsorption experiments at higher temperatures; 50.0% of carbon at room temperature vs. 61.3% at 57° C.

Example 4

This Example illustrates the effect of adsorption time on the level of polymeric material on the surface of copper foil.

The procedures of Example 2 were followed except for the following modifications. Two cleaned copper foils were treated separately with 20 mL of chloroform solutions (0.01 g/mL) of POSH (95:5 molar ratio) and POSCN (95:5 molar ratio) taken in two separate vials for a period of 3 days in both cases. The XPS spectroscopic analysis of these foils showed a higher carbon content than that obtained with foils contacted at lesser adsorption time of 16 hours. The extent of this increase was greater for the POSH copolymer. The carbon content increased from 58.1% to 73% for POSH copolymer, and 47.1% to 54% for POSCN copolymer. A control experiment wherein copper foil was immersed in chloroform for 3 days was also carried out. The carbon content on this foil was unchanged and remained at 37% as in Run No. 1, Example 2.

Example 5

The procedures of Example 2 were followed except for the following modifications. The polymers employed were terpolymers: PSPEVB1SCN (styrene:4-thiocyanatomethylstyrene:vinyl benzyl polyethylene glycol monomer=80:10:10 molar ratio), and PSPEVB1SAC (styrene:4-thioacetoxymethylstyrene:vinyl benzyl polyethylene glycol monomer=80:10:10 molar ratio). These terpolymers were dissolved in toluene at a concentration of 0.01 g/mL. The adsorption experiments were carried out using 20 mL of these toluene solutions at 25° C. for a period of 38 hours. The treated foils were washed in a stream of toluene and blown dry with nitrogen. The results from the XPS analysis are given in Table 3. Two control experiments are also listed in Table 3; one control was carried out by simply immersing copper foil in toluene for a period of 38 hours (Run No. 1, Table 3), and a second control was carried out by immersing copper foil in a solution of polystyrene in toluene (0.01 g/mL of polystyrene in toluene; Run No. 2, Table 3).

TABLE 3

| Run No. | Terpolymer | Composition (mol %) (styrene $M_1^a$:$M_2^b$) | Atomic percentages (%) | | | | |
|---|---|---|---|---|---|---|---|
| | | | Cu | S | C | O | N |
| 1 | Starting Cu foil | — | 9.3 | 0.0 | 38.6 | 38.9 | 13.1 |
| 2 | PS | — | 4.0 | 0.0 | 57.6 | 26.5 | 10.2 |
| 3 | PSPEVB1SAC | 80:10:10 | 2.1 | 2.1 | 74 | 19 | 2.6 |
| 4 | PSPEVB1SCN | 80:10:10 | 1.9 | 0.7 | 72 | 20 | 5.1 |

$^a M_1$ is a sulfur derivatized monomer;
$^b M_2$ is a vinyl benzyl polyethylene glycol monomer.

It is apparent from theses results that increased adsorption of terpolymers on the surface of copper foils were observed as evidenced by the increased carbon contents on the surface of the copper foils.

14

Example 6

This Example illustrates the formation of polymeric layers on an aluminum foil. The procedures as set forth in Example 2 were used except for the following modifications. The aluminum foil was cleaned by extraction with toluene for 24 hours and then heated to 235° C. for 4 days to produce a clean surface. Homopolymers, PAS and PHS, and copolymers, P(SAS), P(SHS), and P(STFAS) were used for the treatment studies with aluminum foil. All of the polymers were dissolved in toluene at a concentration of 0.7 to 8.0 weight percent in toluene except for PHS. PHS was dissolved in acetonitrile at a concentration of 0.01 g of PHS in 20 mL of acetonitrile. The adsorption experiments were carried out for a period of about 24 hours in all cases. The polymer treated aluminum foils were then analyzed by XPS spectroscopy and by contact angle measurements. The results are summarized in Table 4.

TABLE 4

| Run No. | Polymer | Composition (mol %) (styrene:$M_1^a$) | Atomic percentages (%) | | Contact Angle ($\Theta a_{(max)}$, degree) |
|---|---|---|---|---|---|
| | | | Al | C | |
| 1 | Starting Al foil | — | 27.2 | 16.7 | 25 |
| 2 | PAS | — | 0.3 | 83.2 | 70 |
| 3 | PHS$^b$ | — | 11.0 | 60.0 | 64 |
| 4 | P(SAS) | 90:10 | 8.6 | 76.7 | 84 |
| 5 | P(SHS) | 90:10 | 10.1 | 72.9 | 84 |
| 6 | P(STFAS) | 90:10 | 8.6 | 70.4 | 88 |

$^a M_1$ is a molar ratio of the comonomer used with styrene;
$^b$acetonitrile was used as the solvent in this case.

It is evident from the results given in Table 4 that the polymeric layers are readily formed on aluminum foil. The contact angle measurements further show that the hydrophilic aluminum surface is converted to hydrophobic surface after polymer treatment. This is evidenced by the fact that an increase in value of the contact angle of up to 88° for the polymer treated aluminum foil was d when compared with 25° for the untreated aluminum foil.

Example 7

The Example 6 is repeated using two cleaned aluminum foil samples and PHS as the polymeric material. These two PHS treated aluminum foil samples were then used for further grafting experiments as follows. One PHS treated aluminum foil sample was treated with a solution of 2 mL of dimethyldichlorosilane in DMF (9 mL) in the presence of triethylamine (1 mL) for about 24 hours at room temperature. A second PHS treated aluminum foil sample was treated with 1,6-diisocyanatohexane (2 mL) in toluene (18 mL) at 60° C. under nitrogen for about 24 hours. After such treatment of the samples in both cases the samples were removed from the respective solution vials and rinsed with the respective solvents used, blown dry under nitrogen, and analyzed by XPS spectroscopic analysis. A portion of both of these sample foils were also extracted with acetone for 24 hours to determine if the grafted material can be removed by acetone extraction. The extracted samples were also analyzed by XPS. The results are given in Table 5. For comparison, the XPS data of the starting PHS modified aluminum foil is also given in Table 5 (Run No. 1, Table 5).

TABLE 5

| Run | | Atomic percentages (%) | | | | |
|---|---|---|---|---|---|---|
| No | Description of Samples | C | O | Al | Si | N |
| 1 | PHS-modified aluminum foil | 44.2 | 37.4 | 18.5 | 0.0 | 0.0 |
| 2 | PHS-modified aluminum foil with dimethyldichlorosilane | 46.8 | 32.9 | 16.9 | 3.3 | 0.0 |
| 3 | Extracted PHS-modified aluminum foil treated with dimethyldichlorosilane | 43.3 | 36.5 | 17.7 | 2.5 | 0.0 |
| 4 | PHS-modified aluminum foil treated with 1,6-diisocyanatohexane | 59.7 | 24.9 | 11.3 | 0.0 | 4.2 |
| 5 | Extracted PHS-modified aluminum foil treated with 1,6-diisocyanatohexane | 59.2 | 24.9 | 12.1 | 0.0 | 3.8 |

It is evident from the data presented in Table 5 that the product foils are modified in that they contain either silicon or nitrogen based on the grafting agent (Run Nos. 2 and 4, Table 5). Furthermore, very little of these grafting agents were removed by extraction with acetone because there were only slight changes in atomic percentages after the extraction (Run Nos. 3 and 5, Table 5).

Example 8

The Example 6 is repeated except that the polymer used was a terpolymer, P(SASVBC). A portion of this terpolymer modified aluminum foil was then treated with a THF solution of the sodium salt of monomethoxy poly(ethylene glycol) (Molecular weight 5000, PEG$_{5000}$.) for 24 hours. After reaction, the foil was washed with water and acetone and then dried under a nitrogen atmosphere. Both of these samples were analyzed by XPS spectroscopy and by contact angle goniometry. The results are given in Table 6.

TABLE 6

| Run | | Atomic percentages (%) | | | | | |
|---|---|---|---|---|---|---|---|
| No | Description of Samples | C | O | Al | Cl | Na | Θa (°) |
| 1 | P(SASVBC)-modified aluminum foil | 62.3 | 23.2 | 13.4 | 1.1 | 0.0 | 82 |
| 2 | NaPEG$_{5000}$/P(SASVBC)-modified aluminum foil | 48.2 | 36.1 | 15.2 | 0.3 | 0.2 | 54 |

The data in Table 6 show that the hydrophobic surface of the aluminum foil in Run No. 1 is modified to more hydrophilic surface in Run No. 2, as evidenced by the change in contact angle from 82° in Run No. 1 to 54° in Run No. 2. Furthermore, the amount of chlorine is decreased, and presence of sodium is confirmed in Run No.2, thus confirming the reaction of terpolymer, P(SASVBC), with NaPEG$_{5000}$ on the surface of aluminum foil.

Example 9

The Example 6 is repeated except that the polymer used was a terpolymer, P(SASVBOCOCCl$_3$). One portion of the terpolymer treated aluminum foil was then treated with a 20 mL solution of acrylic acid in benzene (1 molar solution—72 g of acrylic acid dissolved in 1000 mL of benzene), and in the presence of Mn$_2$(CO)$_{10}$ (0.005 g) and exposed to tungsten light at room temperature for 2 hours. After this period, the foil was removed from the reaction mixture and washed with water and methanol and dried under nitrogen.

Another portion of the terpolymer treated sample was similarly treated with a solution of methacrylonitrile in benzene (4 molar solution—268 g of methacrylonitrile dissolved in 1000 mL of benzene) in the presence of Mn$_2$(CO)$_{10}$ (0.005 g) and exposed to tungsten light at room temperature for 8 hours. After this period, the foil was removed from the reaction mixture, washed with water and methanol, and dried under a nitrogen atmosphere. Both of these samples along with the starting aluminum foil, and the terpolymer treated aluminum foil were analyzed by XPS spectroscopy and contact angle goniometry. The results are given in Table 7. Also included in Table 7 are the results of two control samples, which were treated just with acrylic acid and methacrylonitrile.

TABLE 7

| Run | | Atomic percentages (%) | | | | | |
|---|---|---|---|---|---|---|---|
| No | Description of Samples | C | O | Al | Cl | Na | Θa (°) |
| 1 | Starting untreated aluminum foil | 16.7 | 56.1 | 27.2 | 0.0 | 0.0 | 25 |
| 2 | P(SASVBOCOCCl$_3$)-modified aluminum foil | 64.7 | 19.7 | 12.9 | 2.6 | 0.0 | 81 |
| 3 | P(SASVBOCOCCl$_3$)-modified aluminum foil grafted with acrylic acid | 62.2 | 37.4 | 0.4 | 0.0 | 0.0 | 23 |
| 4 | Aluminum foil treated with acrylic acid (control) | 48.7 | 40.5 | 10.8 | 0.0 | 0.0 | 22 |
| 5 | P(SASVBOCOCCl$_3$)-modified aluminum foil grafted with methacrylonitrile | 42.1 | 39.8 | 14.8 | 0.0 | 3.4 | 77 |
| 6 | Aluminum foil treated with methacrylonitrile (control) | 25.6 | 49.8 | 23.4 | 0.0 | 1.3 | 48 |

It is evident from the contact angle data presented in Table 7 that the hydrophobic surface of the aluminum foil in Run No. 2 can be modified to a hydrophilic surface by treatment with a suitable grafting agent as shown in Run No. 3.

Example 10

The Example 6 is repeated using PAS as the polymeric material. A portion of the PAS treated aluminum foil was then irradiated in XPS spectrometer. The irradiated sample was then extracted with acetone in a Soxhlet apparatus for about 48 hours. Similarly, a sample of PAS treated aluminum foil, which was not irradiated was also extracted with acetone for comparison. All of the samples were then analyzed by XPS spectroscopy. The results are given in Table 8.

TABLE 8

| Run | | Atomic percentages (%) | | |
|---|---|---|---|---|
| No. | Description of Samples | C | O | Al |
| 1 | Starting aluminum foil | 16.3 | 55.2 | 28.5 |
| 2 | PAS modified aluminum foil | 81.4 | 17.4 | 1.2 |
| 3 | PAS modified aluminum foil irradiated with XPS and extracted with acetone | 74.8 | 19.2 | 3.0 |
| 4 | PAS modified aluminum foil not irradiated with XPS and extracted with acetone | 41.6 | 39.3 | 19.1 |

Although the invention has been illustrated by certain of the preceding examples, it is not to be construed as being limited thereby; but rather, the invention encompasses the generic area as hereinbefore disclosed. Various modifications and embodiments can be made without departing spirit and scope thereof.

What is claimed is:

1. A polymeric material wherein it is a copolymer of a monomer selected from the group consisting of 4-thiocyanatomethylstyrene, 4-thiolmethylstyrene, 4-thioacetoxystyrene, and 4-trifluoroacetoxystyrene; and a styrenic derivative having the structure:

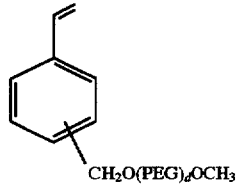

CH₂O(PEG)ₐOCH₃ wherein PEG is a polyethylene glycol moiety and d represents molecular weight of said polyethylene glycol moiety, which ranges from about 200 to about 10,000, and mixtures thereof.

2. The polymeric material as set forth in claim 1 wherein said material has a number average molecular weight ranging from about 4,000 to about 100,000.

3. The polymeric material as set forth in claim 2 wherein said copolymer contains a molar ratio of said monomer to said styrenic derivative within the range from about 1:99 to about 99:1.

4. A polymeric material wherein it is a terpolymer of styrene; a second monomer selected from the group consisting of 4-hydroxystyrene, 4-acetoxystyrene, 4-thiocyanatomethylstyrene, 4-thiolmethylstyrene, 4-thioacetoxystyrene, and 4-trifluoroacetoxystyrene; and a third monomer having the structure:

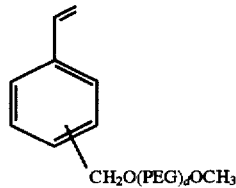

CH₂O(PEG)ₐOCH₃ wherein PEG is a polyethylene glycol moiety and d represents molecular weight of said polyethylene glycol moiety, which ranges from about 200 to about 10,000, and mixtures thereof.

5. The polymeric material as set forth in claim 4 wherein said material has a number average molecular weight ranging from about 4,000 to about 100,000.

6. The polymeric material as set forth in claim 4 wherein said terpolymer contains on a mole basis from about 1% to about 98% of styrene; from about 2% to about 98% of said second monomer; and from about 1% to about 45% of said third monomer.

7. The polymeric material as set forth in claim 4 wherein said terpolymer contains on a mole basis at least about 60% of styrene.

* * * * *